US009553724B2

(12) United States Patent
Takikita

(10) Patent No.: US 9,553,724 B2
(45) Date of Patent: Jan. 24, 2017

(54) CAR-CHARGING SYSTEM

(75) Inventor: Mamoru Takikita, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 1223 days.

(21) Appl. No.: 12/610,656

(22) Filed: Nov. 2, 2009

(65) Prior Publication Data

US 2010/0271172 A1 Oct. 28, 2010

(30) Foreign Application Priority Data

Apr. 27, 2009 (JP) ................................ 2009-107667

(51) Int. Cl.
*B60L 11/18* (2006.01)
*H02J 7/00* (2006.01)
(Continued)

(52) U.S. Cl.
CPC .............. *H04L 9/32* (2013.01); *B60L 11/1824* (2013.01); *H04L 63/08* (2013.01); *B60L 2270/32* (2013.01);
(Continued)

(58) Field of Classification Search
CPC .............. B60L 11/1816; B60L 11/1846; B60L 11/1848; B60L 11/182; B60L 11/1824; B60L 11/1842; B60L 11/1838; B60L 11/185; B60L 2270/36; B60L 11/14; B60L 11/1811; B60L 11/1814; B60L 11/1831; B60L 11/18; B60L 15/2072; B60L 1/006; B60L 2210/30; B60L 2210/40; B60L 2220/54; B60L 2230/16; B60L 2240/80; B60L 2250/20; B60L 2270/32; B60L 2270/34; B60L 2270/38; B60L 3/00; B60L 3/04; B60L 8/003; H02J 7/0004; H02J 7/02;H02J 2007/0001; H02J 2007/0096; H02J 7/0027; H02J 7/027; H02J 7/042; G06Q 50/06; G06Q 20/3674; H01M 10/44; G07B 15/063; G07C 5/008; G07C 5/0858; G08G 1/017; G08G 1/096716; G08G 1/096758; G08G 1/096783; H01F 27/362; H01F 38/14; H04B 5/00; H04B 5/0031; H04B 5/0037; H04B 5/0081; H04M 3/42365; H04M 3/42374; H04W 72/042; H05K 9/002
(Continued)

(56) References Cited

U.S. PATENT DOCUMENTS 7,288,918 B2 * 10/2007 DiStefano .................... 320/108
8,000,858 B2 * 8/2011 Tonegawa et al. ............ 701/36
(Continued)

FOREIGN PATENT DOCUMENTS

JP 10-262303 * 9/1998 ............. B60L 11/18
JP 2007-228695 A 9/2007
(Continued)

OTHER PUBLICATIONS

Standard specification for DSRC section of ITS On-Boaad Unit, Standard of Japan Electronics and Information Technology Industries Association, JEITA TT-6002A, Established in Mar. 2007.
(Continued)

*Primary Examiner* — Fekadeselassie Girma
(74) *Attorney, Agent, or Firm* — Sughrue Mion, PLLC; Richard C. Turner

(57) ABSTRACT

The car-charging system can charge only an authenticated car both in a public parking area and at home. The car-charging system is capable of charging a charge-accumulating device in the car to be charged through a power-supplying line from a power source outside the car, and is
(Continued)

1 CAR-CHARGING SYSTEM
2 POWER-SUPPLYING DEVICE
7 AC POWER SOURCE
5 POWER-SUPPLYING-LINE COMMUNICATION DEVICE
4 POWER-SUPPLYING SWITCH
8 POWER-SUPPLYING-LINE CONNECTION
3 AUTHENTICATION-MANAGING DEVICE
6 HUMAN-MACHINE INTERFACE DEVICE
14
9 CAR
11 POWER-SUPPLYING-LINE COMMUNICATION DEVICE
13 CHARGER
10 DSRC ONBOARD DEVICE
12 CHARGE-ACCUMULATING DEVICE
14 POWER-SUPPLYING LINE arranged to authenticate the car by means of communication between an authentication-managing device in a power-supplying device outside the car and a DSRC onboard device in the car. The authentication-managing device and DSRC onboard device each have a DSRC basic application software program implemented thereon.

1 Claim, 5 Drawing Sheets

(51) Int. Cl.
*G08G 1/017* (2006.01)
*H04M 3/42* (2006.01)
*H04L 9/32* (2006.01)
*H04L 29/06* (2006.01)

(52) U.S. Cl.
CPC ....... *H02J 7/0004* (2013.01); *H02J 2007/0001* (2013.01); *H04L 63/0492* (2013.01); *H04L 63/0853* (2013.01); *H04L 2209/80* (2013.01); *H04L 2209/84* (2013.01); *Y02T 10/7005* (2013.01); *Y02T 10/7072* (2013.01); *Y02T 90/12* (2013.01); *Y02T 90/121* (2013.01); *Y02T 90/14* (2013.01); *Y02T 90/16* (2013.01)

(58) Field of Classification Search
USPC .......................................................... 340/5.8
See application file for complete search history.

(56) References Cited

U.S. PATENT DOCUMENTS

| | | | | |
|---|---|---|---|---|
| 2005/0020211 | A1* | 1/2005 | Takikita | 455/41.2 |
| 2005/0192727 | A1* | 9/2005 | Shostak | B60C 11/24 701/37 |
| 2008/0055058 | A1 | 3/2008 | Nishiyama | |
| 2009/0043450 | A1* | 2/2009 | Tonegawa et al. | 701/36 |
| 2009/0224939 | A1* | 9/2009 | Stocker et al. | 340/870.02 |
| 2009/0278492 | A1* | 11/2009 | Shimizu et al. | 320/108 |
| 2010/0145885 | A1* | 6/2010 | Graziano et al. | 705/412 |
| 2010/0231163 | A1* | 9/2010 | Mashinsky | 320/108 |

FOREIGN PATENT DOCUMENTS

| | | | |
|---|---|---|---|
| JP | 2008-061432 | A | 3/2008 |
| JP | 3148265 | U | 1/2009 |
| JP | 2009-089452 | A | 4/2009 |

OTHER PUBLICATIONS

Guide-line of specification for DSRC basic application interface, Outline of the function on DSRC basic application interface, ITS FORUM RC-004, Nov. 22, 2005.
Wikipedia, "Dedicated Short Range Communication," Jan. 2009, URL: http://de.wikipedia,org/w/index.php?title=Dedicated__Short__Range__Communication&Oldid=54038677.
German Patent Office, "Office Action," issued in connection with German Patent Application No. 10 2009 055 818.7, dated Feb. 27, 2014.

* cited by examiner

1 CAR-CHARGING SYSTEM
2 POWER-SUPPLYING DEVICE
14 POWER-SUPPLYING LINE
9 CAR
CHARGER
13
12
CHARGE-ACCUMULATING DEVICE
POWER-SUPPLYING-LINE COMMUNICATION DEVICE
11
10
DSRC ONBOARD DEVICE
14
8
POWER-SUPPLYING-LINE CONNECTION
4
POWER-SUPPLYING SWITCH
6
HUMAN-MACHINE INTERFACE DEVICE
7
AC POWER SOURCE
5
POWER-SUPPLYING-LINE COMMUNICATION DEVICE
3
AUTHENTICATION-MANAGING DEVICE

START OF CAR-CHARGING SYSTEM
CONNECT THE POWER-SUPPLYING LINE
S1
READ OUT THE MEMORY TAG OF THE CAR
S2
S3
DOES AUTHENTICATION DATA MATCH WITH THE CONTENT OF THE TAG ?
NO
YES
CLOSE THE POWER-SUPPLYING SWITCH
S4
S6
IS ELECTRIC POWER SUPPLIED?
YES
NO
S5
NOTIFY THE INABILITY TO CHARGE
ISSUE A NOTICE OF COMPLETION OF THE CHARGING
S7
END

201 CAR-CHARGING SYSTEM
202 POWER-SUPPLYING DEVICE
9 CAR
13 CHARGER
12 CHARGE-ACCUMULATING DEVICE
10 DSRC ONBOARD DEVICE
14
8 POWER-SUPPLYING-LINE CONNECTION
4 POWER-SUPPLYING SWITCH
7 AC POWER SOURCE
203 WIRELESS COMMUNICATION DEVICE
3 AUTHENTICATION-MANAGING DEVICE
6 HUMAN-MACHINE INTERFACE DEVICE

CAR-CHARGING SYSTEM

BACKGROUND OF THE INVENTION

Field of the Invention

The present invention relates to a car-charging system of a car equipped with a charge-accumulating device chargeable from the outside thereof, and particularly to authentication of the car.

Description of the Related Art

In recent years, an electric car equipped with a charge-accumulating device and an electric motor, and a so-called hybrid car have been studied as environmentally friendly vehicles. Such cars are driven by an electric motor using electric power of a charge-accumulating device as they run, and therefore it is required to charge the charge-accumulating device. To charge the charge-accumulating device, a dedicated power source in a public parking area and a commercial household power source can be used.

When charging the charge-accumulating device, it is necessary to perform authentication between a power-supplying device and car in question regardless of whether the car is in a public parking area or at home and check whether or not the car is one which may be charged for the purpose of preventing the theft of electric power.

A prior art-related patent document, Japanese Unexamined Patent Application Publication JP-A-2007-228695 discloses a car-charging system which uses information on an ETC card to authenticate a user of the car. Also, another document, JP-A-2008-61432 discloses a car-charging system which uses a cryptographic key recorded in a charger of a car for authentication.

Further, according to a prior art-related non-patent document, *ITS Shyasai-ki DSRC-bu hyou-jun shiyou* (*ITS onboard device DSRC part standard specifications*) *JEITA TT*-6002A, a DSRC onboard device, which is a DSRC application system, has been standardized and put to practical use as a communication system such that a road-side unit and a car authenticate each other and exchange information therebetween. Likewise, another non-patent document, *dedicated short range communication* (hereinafter referred to as "DSRC") *basic application interface specifications' guideline ITS FORUM RC*-004 standardizes and shows an application software program for a road-side unit to authenticate an onboard device and to bill a car concerned.

It is preferable that car-charging systems use a common car-authentication method in both cases where charging is performed from a dedicated power source in a public parking area and where charging is conducted from a commercial household power source.

However, the car-charging system as disclosed by the patent document JP-A-2007-228695 has the problem of the impossibility of supporting a power-supplying device for household use. This is because such car-charging system needs to use ETC card information to identify an individual in authentication although the information is undisclosed in general. Further, the car-charging system as disclosed by the patent document JP-A-2008-61432, which uses a cryptographic key recorded in a car-charging device in authentication, has the problem that as the cryptographic key varies depending on the car manufacturer and the type or model of the car, it has no general versatility and cannot be used in e.g. a public parking area.

With a functional configuration of a DSRC onboard device defined by *ITS Shyasai-ki DSRC-bu hyou-jun shiyou* (*ITS onboard device DSRC part standard specifications*) *JEITA TT*-6002A, an application software program can be executed through the wireless communication, but it is not taken into account to allow an external device to execute it through an interface.

SUMMARY OF THE INVENTION

Therefore, it is an object of the invention to provide a car-charging system which can authenticate a car to be charged by use of a common system both in a public area and at home.

A car-charging system according to the invention is one which can charge a charge-accumulating device in a car through a power-supplying line from a power source outside the car, and which is arranged to authenticate a car to be charged by means of communication between an authentication-managing device in a power-supplying device outside the car and a DSRC onboard device in the car.

The invention can realize a car-charging system which can authenticate a car to be charged using the same system when charging the car both in a public area and at home, and therefore it can increase the convenience in charging.

The foregoing and other objects, features, aspects, and advantages of the invention will become more apparent from the following detailed description of the invention when taken in conjunction with the accompanying drawings.

DETAILED DESCRIPTION

First Embodiment

Figure 1:
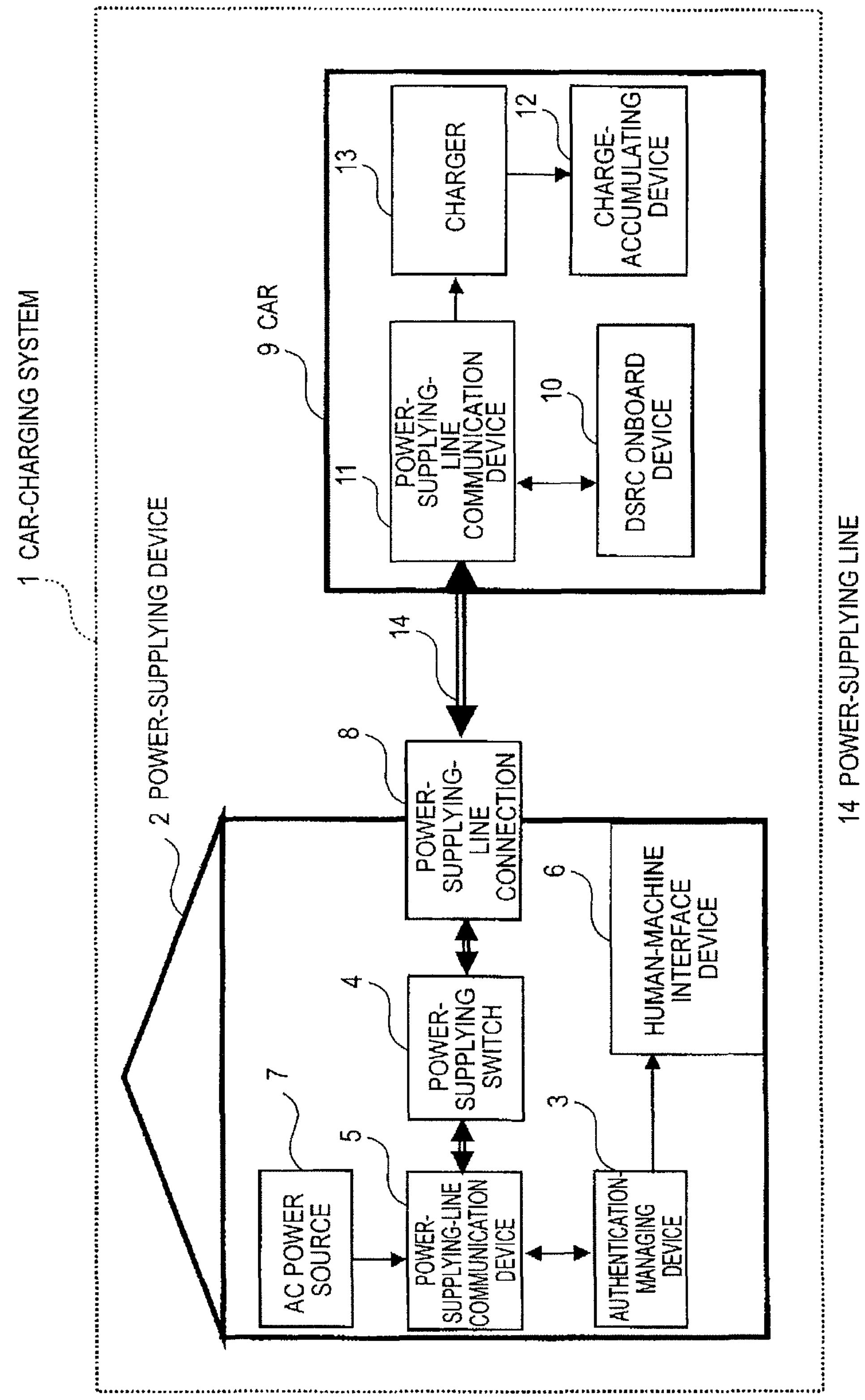
FIG. 1 is a block diagram showing a configuration of a car-charging system according to the first embodiment of the invention.

FIG. 1 is a block diagram generally showing a configuration of a car-charging system according to a first embodiment of the invention. As shown in the drawing, the car-charging system 1 includes a power-supplying device 2, which is placed e.g. at home, and a car 9. The power-supplying device 2 has: an authentication-managing device 3 with a DSRC basic application software program implemented thereon; a power-supplying switch 4; a power-supplying-line communication device 5; a human-machine interface device 6 operable to show a charging state; an AC power source 7 operable to supply a car with electric power for charging; and a power-supplying-line connection 8 connected with a power-supplying line 14 from the car 9.

On the other hand, the car 9 has: a DSRC onboard device 10 with a DSRC basic application software program implemented thereon; a power-supplying-line communication device 11; a charge-accumulating device 12; and a charger 13. At time of charging, the power-supplying line 14 connects between the power-supplying-line connection 8 and power-supplying-line communication device 11. Then, electric power is supplied from the AC power source 7 through the power-supplying line to the charger 13, and therefore passed to the charge-accumulating device 12.

Figure 2:
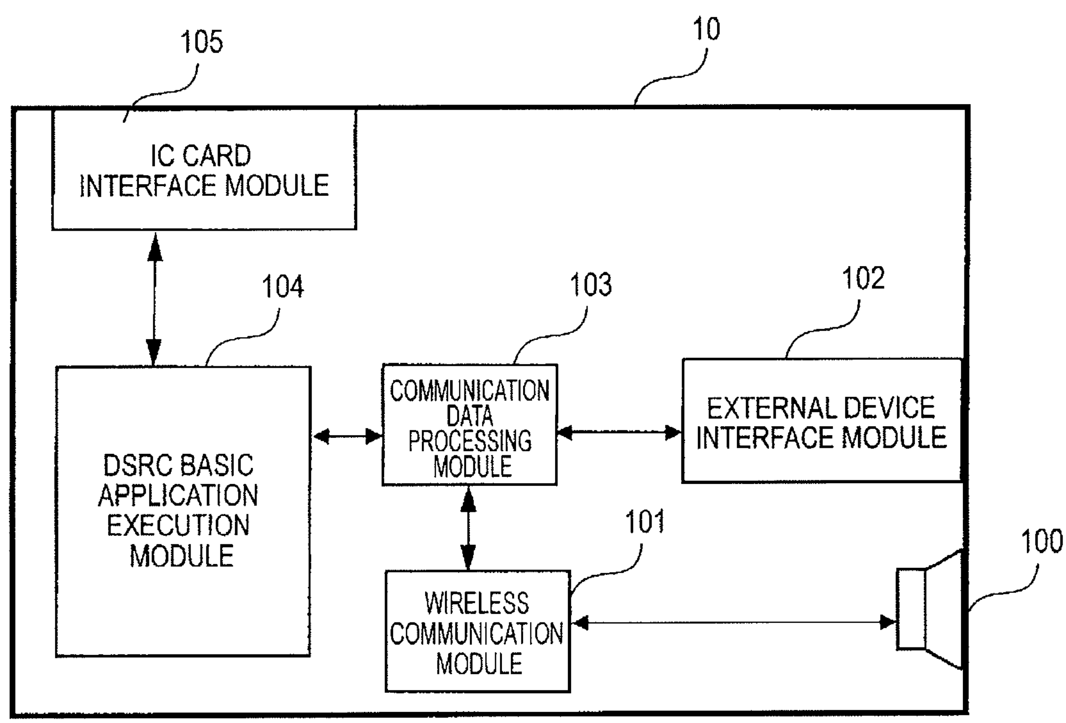
FIG. 2 is a block diagram showing a functional configuration of a DSRC onboard device according to the invention.

FIG. 2 is a block diagram showing a functional configuration of the DSRC onboard device 10 placed in the car 9. As in the drawing, the DSRC onboard device 10 has: a wireless communication module 101 connected with an antenna 100 for wireless communication; an external device interface module 102 connected with the power-supplying-line communication device 11 of the car 9 and operable to exchange data; a communication data processing module 103 operable to treat data from the wireless communication module 101 and the external device interface module 102; a DSRC basic application execution module 104 operable to execute an application software program standardized by *DSRC basic application interface specifications' guideline*; and an IC card interface module 105 operable to control an IC card.

The communication data processing module 103 handles both data in association with the wireless communication module 101 and external device interface module 102. The application software program can be executed by the DSRC basic application execution module 104 through any of the wireless communication module 101 and external device interface module 102.

Now, the charging procedure of the car-charging system 1 will be described with reference to the flow chart of FIG. 3 in detail. An administrator of the car 9 writes authentication data into a predetermined memory tag of the DSRC onboard device 10 in advance. Writing of the authentication data is performed on the side of the car, or conducted by and from the power-supplying device 2 using an onboard-device-memory-access application software program standardized by *DSRC basic application interface specifications' guideline*.

When charging a car 9 targeted for charging, the car administrator plugs one end of the power-supplying line 14 of the car 9 in the power-supplying-line connection 8 placed in the house thereby to connect it with the power-supplying-line communication device 11 of the car 9 (S1). In this step, the power-supplying switch 4 is in OFF, and therefore no electric power is provided.

After that, on detection of the connection with the power-supplying line 14, the authentication-managing device 3 of the power-supplying device 2 reads out authentication data of the memory tag through the power-supplying line 14 and power-supplying-line communication device 5 (S2), provided that the authentication data of the memory tag have been written in advance into the DSRC onboard device 10 inside the car 9 by use of the onboard-device-memory-access application software program.

The authentication-managing device 3 checks whether or not the content of the tag thus read out matches with authentication data previously recorded in the authentication-managing device 3 (S3).

When the content matches with the authentication data, the authentication-managing device 3 closes the power-supplying switch 4. Consequently, charging of the charge-accumulating device 12 from the AC power source 7 through the charger 13 is started (S4).

When the content does not match with the authentication data, the authentication-managing device 3 sends, through the human-machine interface device 6 of the power-supplying device 2, the car administrator or car 9 a notice that the charging cannot be performed (S5).

When the charging is completed, or when the power-supplying line 14 is disengaged and thus the power supply is stopped (S6), the authentication-managing device 3 opens the power-supplying switch 4 and in parallel, notifies the completion of the charging through the human-machine interface device 6 (S7), and then finishes the charging step.

The notice of the impossibility of charging of Step S5 may be sent to the car 9 through a human-machine interface module of the DSRC onboard device 10, which is not shown in FIG. 2, by use of e.g. an onboard device basic direction application software program or an onboard device direction application software program which is standardized by *DSRC basic application interface specifications' guideline.*

In this embodiment, the authentication matching between the authentication-managing device 3 and DSRC onboard device is conducted by means of communication through the power-supplying line 14. However, the authentication matching can be performed through communication by e.g. a dedicated line between the authentication-managing device 3 and an information communication device in the car, which is in connection with the external device interface module 102 of the DSRC onboard device 10, or wireless LAN.

Figure 3:
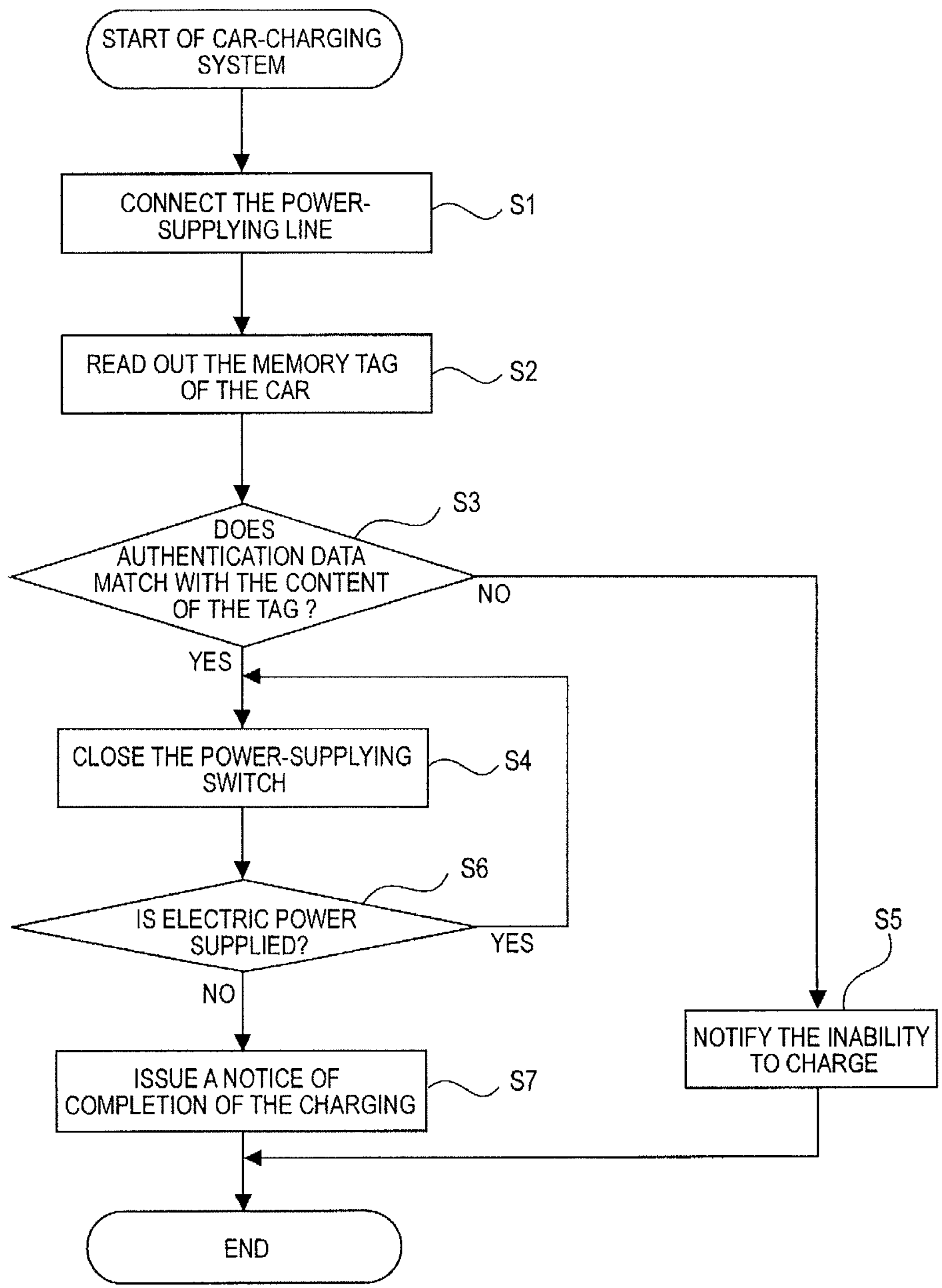
FIG. 3 is a flow chart showing a charging procedure in association with the first embodiment.

In the charging procedure shown by the flowchart of FIG. 3, an onboard-device-memory-access application software program standardized by *DSRC basic application interface specifications' guideline* is used. However, an onboard device ID communication application software program may be used instead. In that case, the car administrator uses an onboard device ID communication application software program to write a predetermined onboard device ID in the DSRC onboard device 10. Then, in Step S2, the authentication-managing device 3 checks whether the onboard device ID gained from the car 9 matches with the authentication data recorded therein.

Second Embodiment

Figure 4:
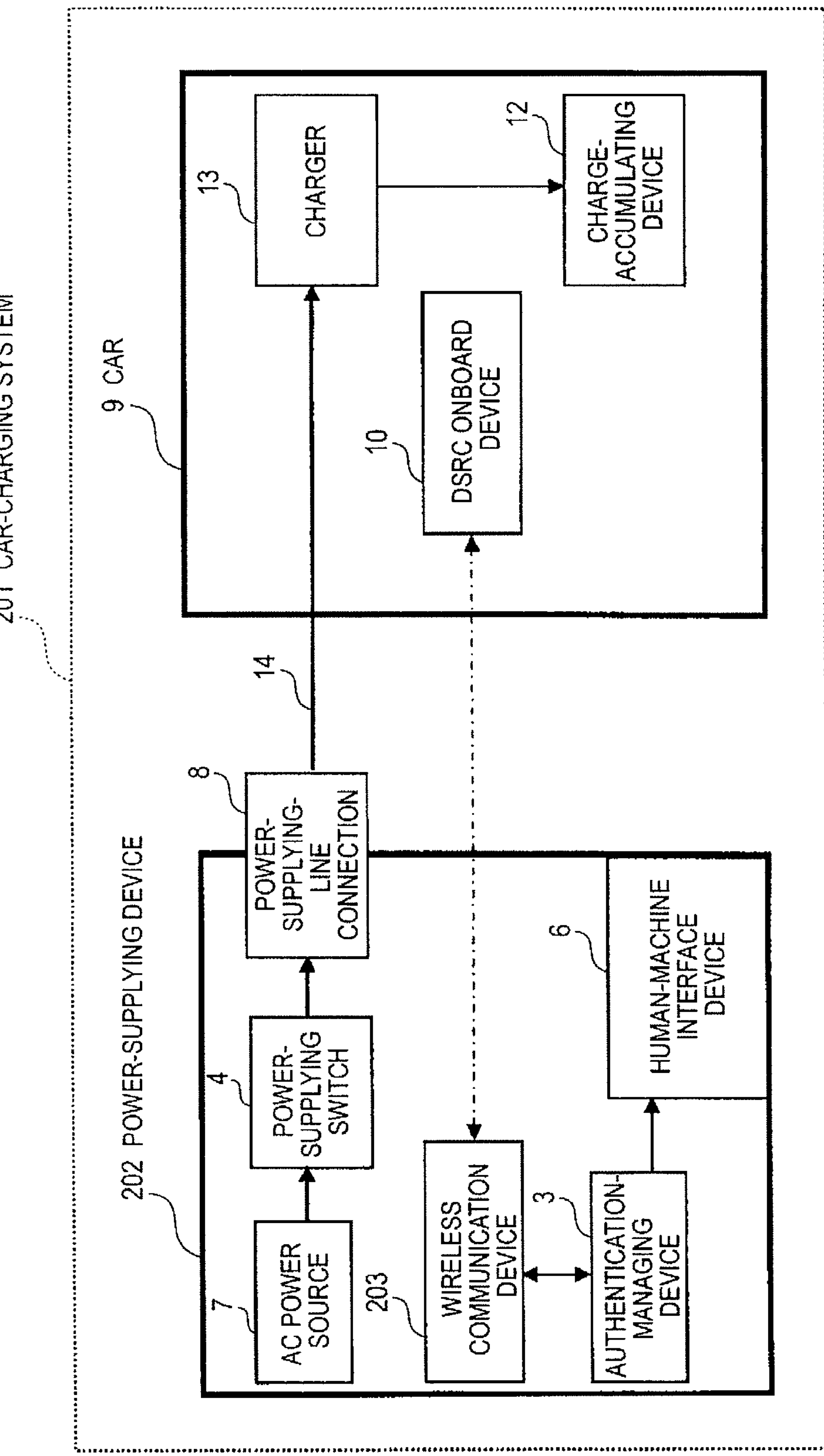
FIG. 4 is a block diagram showing a configuration of a car-charging system according to the second embodiment of the invention.

FIG. 4 is a block diagram generally showing a configuration of a car-charging system according to the second embodiment of the invention. As shown in the drawing, the car-charging system 201 includes a car 9 and a power-supplying device 202, which is placed in e.g. a public parking area. The power-supplying device 202 has: an authentication-managing device 3 with a DSRC basic application software program implemented thereon; a power-supplying switch 4; a wireless communication device 203; a human-machine interface device 6 operable to show a charging state; an AC power source 7 operable to supply a car with electric power for charging; and a power-supplying-line connection 8 connected with a power-supplying line 14 from the car 9.

On the other hand, the car 9 has: a DSRC onboard device 10 with a DSRC basic application software program implemented thereon; a charge-accumulating device 12; and a charger 13. At time of charging, the power-supplying line 14 connects between the power-supplying-line connection 8 and charger 13. Then, electric power is supplied from the AC power source 7 through the power-supplying line 14 to the charger 13, and therefore passed to the charge-accumulating device 12. The DSRC onboard device 10 performs DSRC (Dedicated Short Range Communication) with the wireless communication device 203 by radio.

The functional configuration of the DSRC onboard device 10 is the same as that shown in FIG. 2.

Now, the charging procedure of the car-charging system 201 will be described with reference to the flow chart of FIG. 5 in detail. An administrator of the car 9 writes an onboard device ID corresponding to a power-supplying-equipment administrator ID into the DSRC onboard device 10 in advance. Writing of the onboard device ID is performed on the side of the car, or conducted by and from the power-supplying device 202 using an onboard device ID communication application software program standardized by *DSRC basic application interface specifications' guideline.*

When charging a car 9 targeted for charging, the car administrator connects the power-supplying line 14 of the car to the power-supplying-line connection 8 of the power-supplying device 202 (S101). In this step, the power-supplying switch 4 is in OFF, and therefore no electric power is provided.

After that, on detection of the connection with the power-supplying line 14, the authentication-managing device 3 of the power-supplying device 202 reads out an onboard device ID corresponding to a power-supplying-equipment administrator ID inside the car 9 by use of the onboard device ID communication application software program, through the wireless communication device 203 (S102).

The authentication-managing device 3 checks whether or not the onboard device ID thus read out matches with the authentication data previously recorded in the authentication-managing device 3 (S103).

When the readout matches with the authentication data, the authentication-managing device 3 closes the power-supplying switch 4. Consequently, charging of the charge-accumulating device 12 from the AC power source 7 through the charger 13 is started (S104).

When the readout does not match with the authentication data, the authentication-managing device 3 sends, through the human-machine interface device 6 of the power-supplying device 202, the car administrator or car 9 a notice that the charging cannot be performed (S105).

When the charging is completed, or when the power-supplying line 14 is disengaged and thus the power supply is stopped (S106), the authentication-managing device 3 opens the power-supplying switch 4 and in parallel, notifies the completion of the charging through the human-machine interface device 6 (S107), and then finishes the charging step.

The notice of the impossibility of charging of Step S105 may be sent to the car 9 through a human-machine interface module of the DSRC onboard device 10, which is not shown in FIG. 2, by use of e.g. an onboard device basic direction application software program or an onboard device direction application software program which is standardized by *DSRC basic application interface specifications' guideline.*

Figure 5:
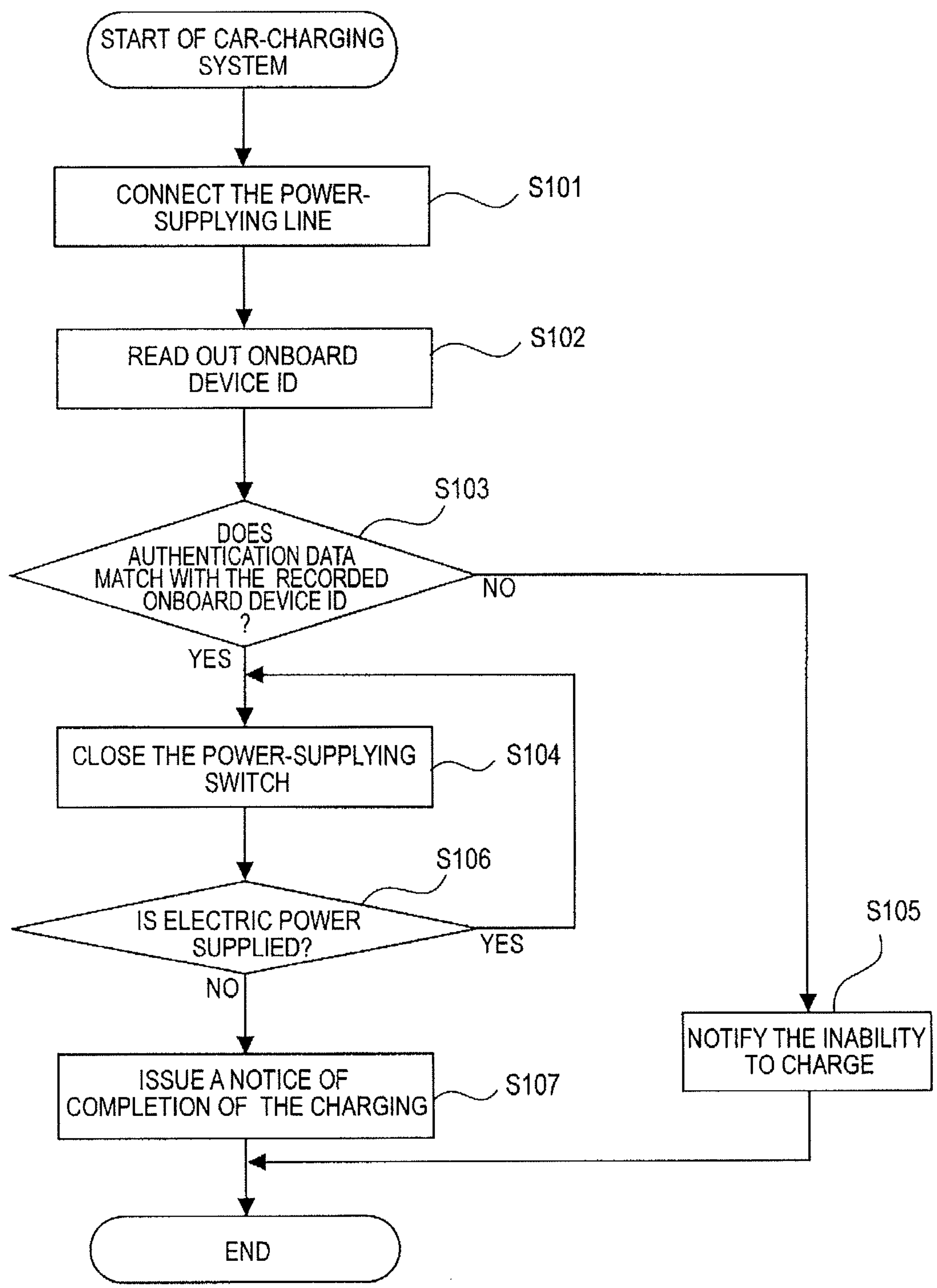
FIG. 5 is a flow chart showing a charging procedure in connection with the second embodiment.

While in the procedure shown in FIG. 5, an onboard device ID communication application software program standardized by *DSRC basic application interface specifications' guideline* is used, it is possible to use an onboard-device-memory-access application software program. In this case, the car administrator uses the onboard-device-memory-access application software program to write authentication data into a predetermined memory tag of the DSRC onboard device 10 through the power-supplying device 202 in advance. Then, in Step S102, a check is made on whether the authentication data of the memory tag, which is gained from the car 9, matches with the authentication data previously recorded in the authentication-managing device 3 or not.

In addition, in the procedure shown in FIG. 5, it is also possible to use an IC card access application software program standardized by *DSRC basic application interface specifications' guideline*. In this case, the car administrator inserts an IC card, e.g. a credit card, in an IC card interface module 105 of the DSRC onboard device 10 to conduct the prescribed credit card authentication between the car and power-supplying device 202, whereby charging can be started.

Further, as to the car-charging system of the second embodiment as shown in FIG. 4, the power-supplying device 202 placed in a public parking area is designed for wireless authentication of cars targeted for charging in consideration of charging for two or more cars. However, the power-supplying device 202 can perform authentication by means of the communication through a power-supplying line as in the system of the first embodiment.

As described above, a car-charging system according to the invention is arranged to conduct authentication by means of communication between an authentication-managing device in a power-supplying device outside the car and a DSRC onboard device in the car targeted for charging. Therefore, the same system can authenticate a car to be charged in charging both in a public area and at home.

Also, according to the invention, an authentication-managing device in a power-supplying device outside the car and a DSRC onboard device in the car targeted for charging enable authentication through a power-supplying line from a power source outside the car, and they also make possible to conduct authentication using DSRC (Dedicated Short Range Communications). In addition, because of using an application software program standardized by *DSRC basic application interface specifications' guideline*, it is possible to conduct authentication using the same application software program in charging a car both in a public area and at home.

Various modifications and alterations of the invention will be apparent to those skilled in the art without departing from the scope and spirit of the invention. It should be understood that this is not limited to the illustrative embodiments set forth herein.

What is claimed is:

1. A car-charging system for a charge-accumulating device in a car operable to be charged through a power-supplying line from a power source outside the car comprising:

an authentication-managing device provided in a power supplying device outside the car; and a Dedicated Short Range Communication (DSRC) onboard device provided in the car, the DSRC onboard device communicating with the authentication-managing device, wherein the DSRC onboard device is equipped with an interface module connecting to an external device, wherein authentication of the car is performed via communication between the authentication-managing device and the DSRC onboard device, and wherein said authentication-managing device and the DSRC onboard device are operable, through the interface module, to separately perform authentication via both the power-supplying line and a DSRC channel.

* * * * *